United States Patent
Matsumoto et al.

(10) Patent No.: US 7,796,680 B2
(45) Date of Patent: Sep. 14, 2010

(54) MOBILE COMMUNICATION SYSTEM AND WIRELESS APPARATUS TO BE USED FOR THE SAME

(75) Inventors: Mariko Matsumoto, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 1069 days.

(21) Appl. No.: 10/589,346

(22) PCT Filed: Feb. 7, 2005

(86) PCT No.: PCT/JP2005/001791

§ 371 (c)(1),
(2), (4) Date: Aug. 11, 2006

(87) PCT Pub. No.: WO2005/078949

PCT Pub. Date: Aug. 25, 2005

(65) Prior Publication Data

US 2009/0268786 A1  Oct. 29, 2009

(30) Foreign Application Priority Data

Feb. 12, 2004  (JP) .............................. 2004-034347

(51) Int. Cl.
*H04L 1/02* (2006.01)
(52) U.S. Cl. ..................................................... 375/148
(58) Field of Classification Search .................. 375/148, 375/230, 267, 299, 347, 349; 700/53; 455/101, 455/132–141

See application file for complete search history.

(56) References Cited

U.S. PATENT DOCUMENTS

| 5,291,519 | A  | 3/1994 | Tsurumaru |
| 6,212,371 | B1 | 4/2001 | Sakuma |
| 6,333,953 | B1 | 12/2001 | Bottomley et al. |

(Continued)

FOREIGN PATENT DOCUMENTS

EP  0 500 326 B1  7/1996

(Continued)

OTHER PUBLICATIONS

T. Kawamura et al., "Throughput Comparison Between Multipath Interference Canceller and Chip Equalizer in HSDPA," Technical Report of IEICE, vol. 101:545, 2002, pp. 89-96.

*Primary Examiner*—Sam K Ahn
(74) *Attorney, Agent, or Firm*—Foley & Lardner LLP

(57) ABSTRACT

A mobile communication system capable of improving the reception characteristic using a small circuit size and low power consumption is provided. The channel vector estimating section 181 estimates channel vectors in a method such as a method in which the section 181 multiplies, according to the multipath timings sent from the multipath timing detecting section, the input signal from the base-station receiving section by a complex conjugate of a known pilot signal to average the input signal (to average the input signal by de-spreading the pilot signal in the case of CDMA). The noise estimating section 182 estimates noise power using received signals and generates a Channel matrix by arranging the estimated channel vectors according to the multipath timings. The weight calculating section 184 calculates a weight matrix using the noise estimation value and the Channel matrix and sets the obtained filter weight vectors to the equalizing filter 185.

32 Claims, 13 Drawing Sheets

U.S. PATENT DOCUMENTS

| | | |
|---|---|---|
| 6,349,119 B1 | 2/2002 | Sogabe et al. |
| 7,149,239 B2 * | 12/2006 | Hudson ................... 375/144 |
| 7,321,646 B2 * | 1/2008 | Arslan et al. ............ 375/346 |
| 7,336,704 B2 * | 2/2008 | Kim et al. ................ 375/232 |
| 2002/0051433 A1 * | 5/2002 | Affes et al. ............... 370/335 |
| 2002/0159415 A1 | 10/2002 | Pan et al. |
| 2003/0035392 A1 | 2/2003 | Pan et al. |
| 2003/0043767 A1 | 3/2003 | Pan et al. |
| 2004/0132416 A1 * | 7/2004 | Yee .............................. 455/82 |
| 2006/0019602 A1 * | 1/2006 | Ionescu et al. ............. 455/10 |

FOREIGN PATENT DOCUMENTS

| | | |
|---|---|---|
| EP | 0 878 921 A1 | 11/1998 |
| EP | 1 128 569 A1 | 8/2001 |
| EP | 1 473 853 A1 | 11/2004 |
| JP | 4-267647 | 9/1992 |
| JP | 5-207076 | 8/1993 |
| JP | 5-276059 | 10/1993 |
| JP | 7-038479 | 2/1995 |
| JP | 11-239082 | 8/1999 |
| JP | 2000-138656 | 5/2000 |
| JP | P3135586 | 12/2000 |
| JP | 2001-510958 A | 8/2001 |
| JP | 2004-159284 A | 6/2004 |
| JP | 2004-523957 A | 8/2004 |
| WO | WO 98/23043 | 5/1998 |
| WO | WO 99/04537 | 1/1999 |
| WO | WO 00/27042 | 5/2000 |
| WO | WO 02/063779 A2 | 8/2002 |
| WO | WO 2004/025876 | 3/2004 |

* cited by examiner

FIG. 1
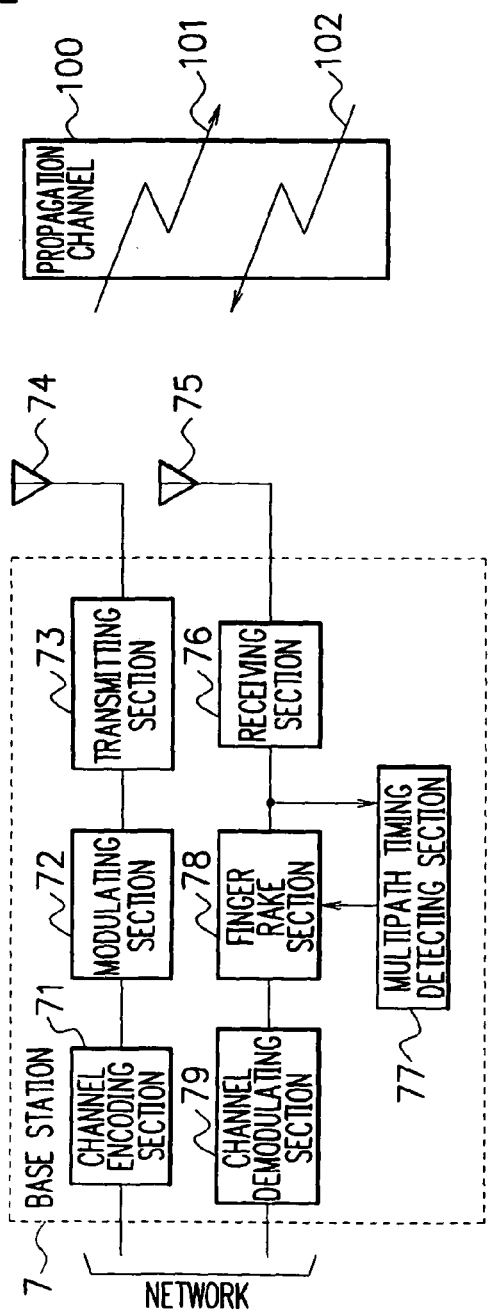
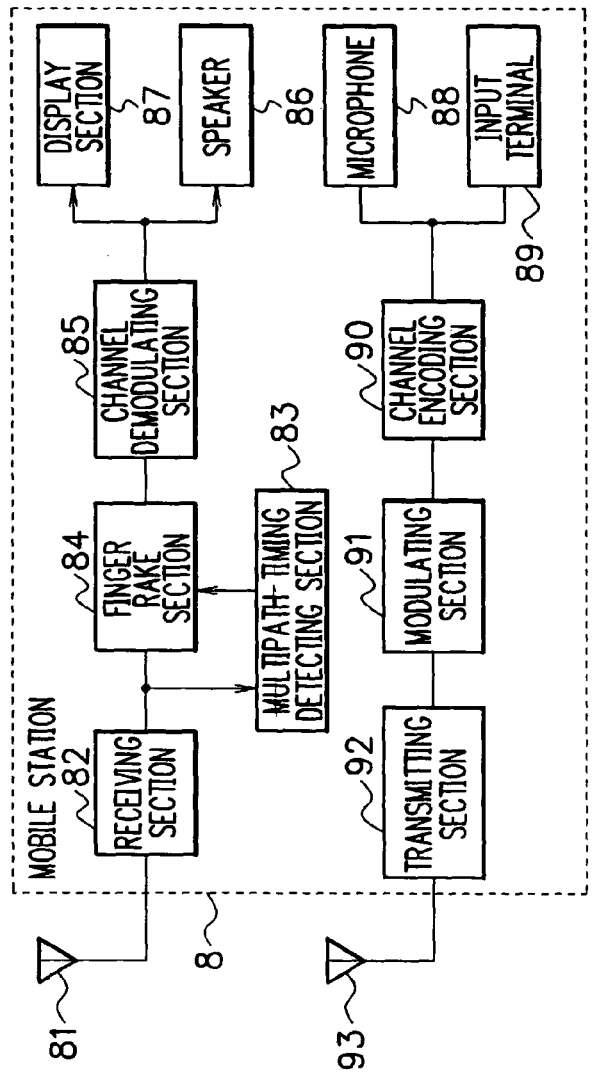

F I G. 4
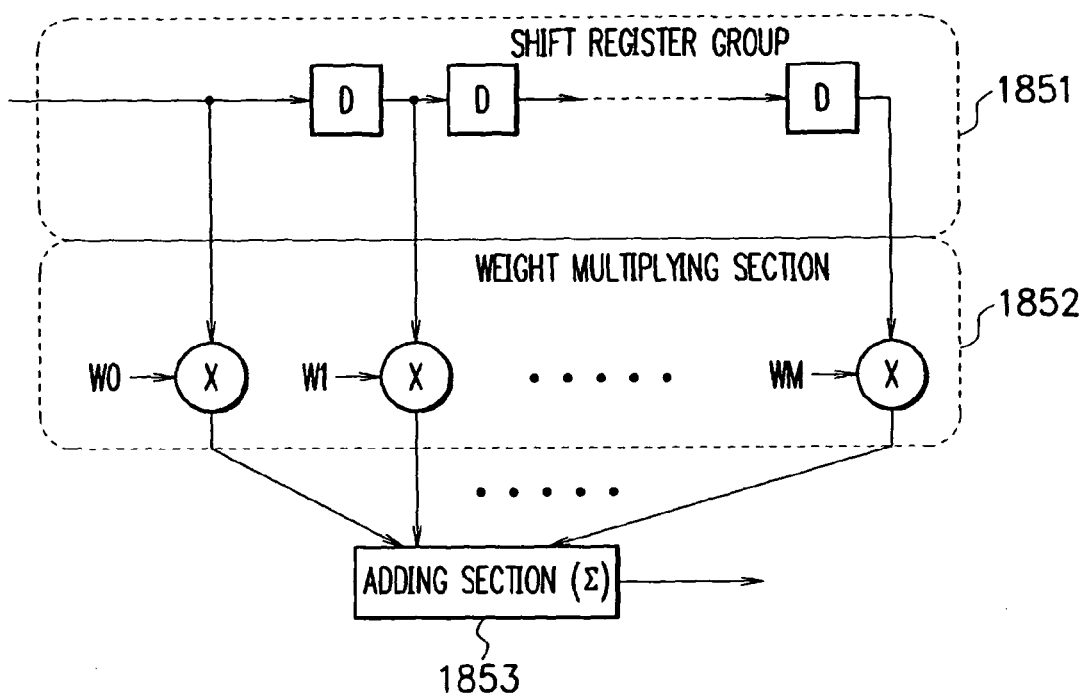

FIG. 5
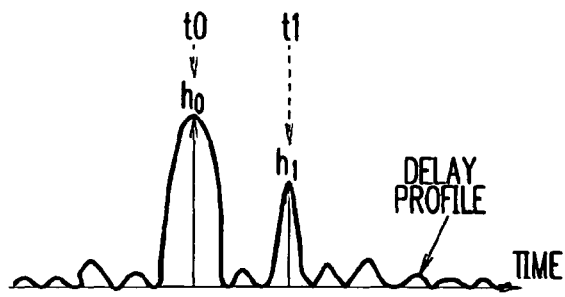
a) DELAY PROFILE (Nca=1)
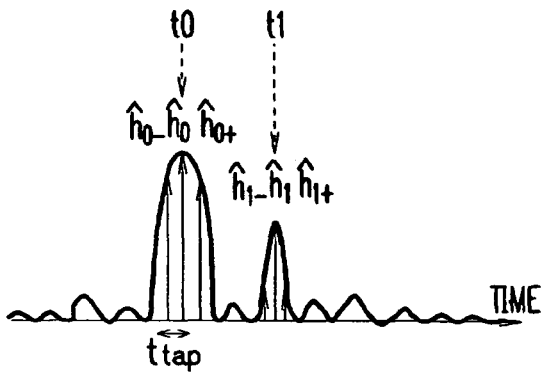
b) DELAY PROFILE (Nca=3)
c) CHANNEL MATRIX (Nca=1)
d) CHANNEL MATRIX (Nca=3)
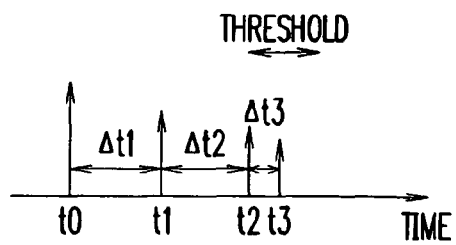
e) CHANNEL MATRIX (Nca=5)
$$W = (\hat{H}^H \hat{H} + \sigma^2 I)^{-1} \hat{H}^H$$
f)

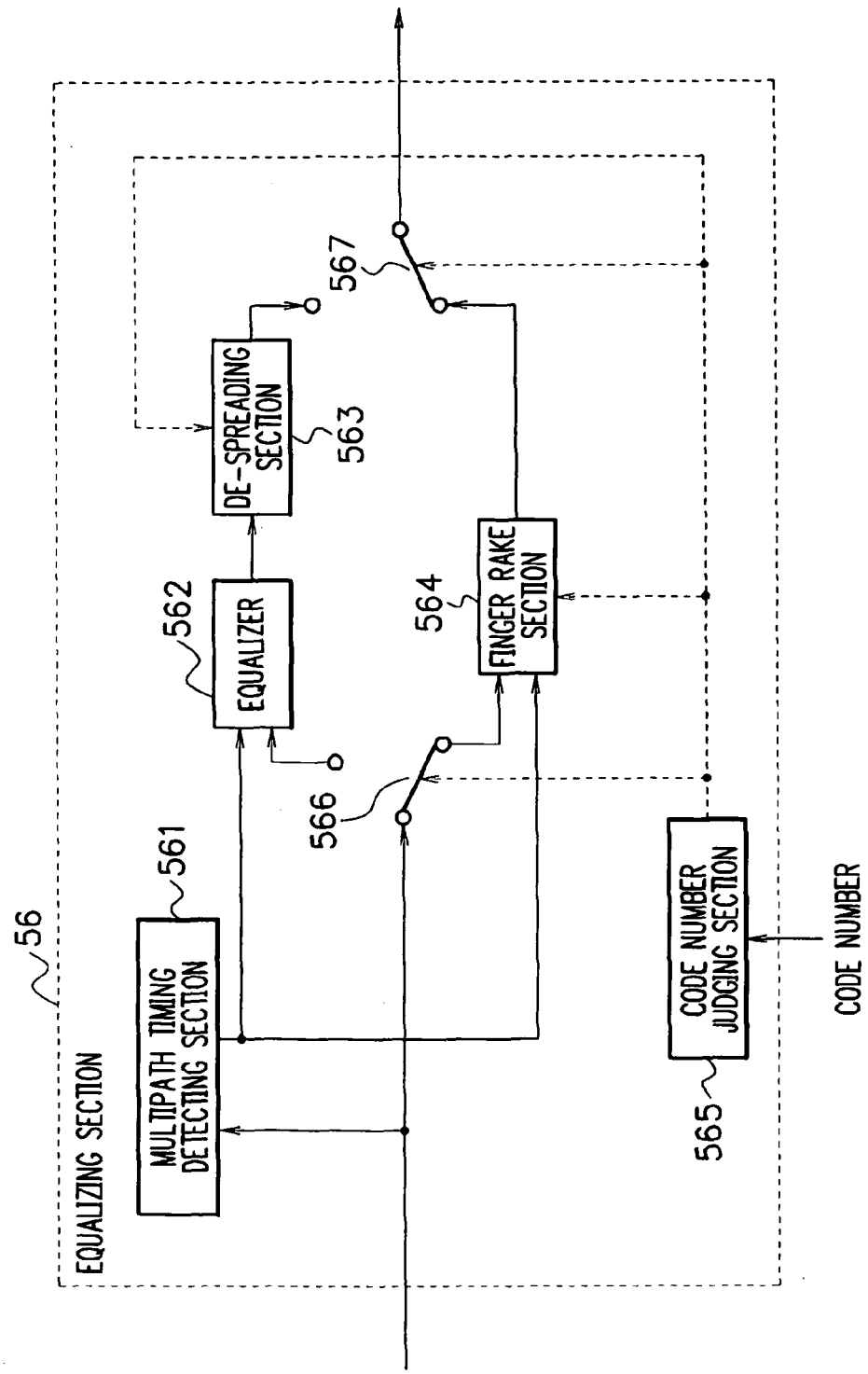

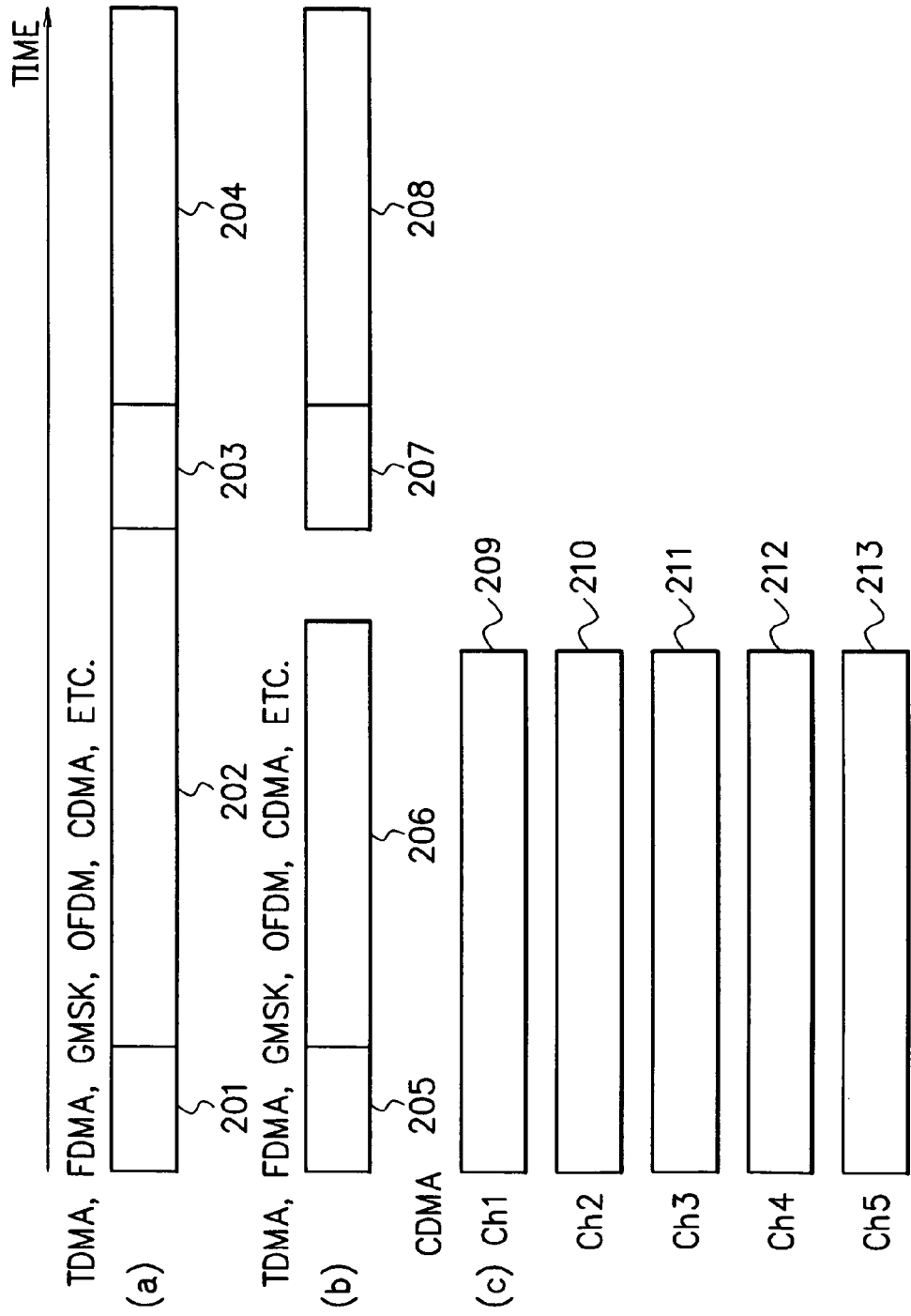

MOBILE COMMUNICATION SYSTEM AND WIRELESS APPARATUS TO BE USED FOR THE SAME

TECHNICAL FIELD

The present invention relates to a mobile communication system and a wireless apparatus to be used for the same, and in particular, to a wireless apparatus that is used for a mobile communication system and includes one or more waveform equalizers.

RELATED ART

Conventionally, in a mobile communication system, which includes a base-station wireless apparatus and a mobile-station wireless apparatus, there has been observed a phenomenon of a multipath in which there exists a plurality of radio-wave propagation paths connecting the base-station wireless apparatus to the mobile-station wireless apparatus.

As the mobile communication system, there exists a system using a Code Division Multiple Access (CDMA) wireless apparatus, and FIG. 1 shows an example of a system thereof.

In FIG. 1, for a signal from a network (not shown), a base station 7 conducts channel encoding suitable for a wireless channel in a channel encoding section 71. For the channel-encoded signal, spread modulation is conducted in a base-station modulating section 72, and the spread-modulated signal is amplified in a base-station transmitting section 73 for transmission thereof and is transmitted as a downward radio wave 101 from a base-station transmission antenna 74. In this regard, the base-station transmitting section 73 may include a digital to analog (D/A) converter and a frequency conversion section converting a frequency into a carrier frequency.

Since the downward radio wave 101 receives influences from a propagation channel 100 such as multipath conditions, channel interference, and noise, reception characteristics are deteriorated due to these influences from the propagation channel 100.

When a mobile-station antenna 81 receives the downward radio wave 101, a mobile station 8 converts the wave 101 into an electric signal and then amplifies the signal by a mobile-station receiving section 82 for reception. Incidentally, the mobile-station receiving section 82 includes an analog to digital (A/D) converter and a frequency conversion section converting a frequency into a baseband frequency depending on cases.

In the amplified signal, a mobile-station multipath timing detecting section 83 detects multipath timings by use of a known pilot signal, and a mobile-station finger rake section 84 conducts de-spreading and rake combining by use of the multipath timings. According to results of the de-spreading and the rake combining, a mobile-station channel decoding section 85 conducts channel decoding. Moreover, if the signal is audio data, the section 85 converts the data into sound and voice to product sound and voice via a speaker 86; if the signal is an image, mail, or other data, a display section 87 displays an image, information, or the like.

On the other hand, the mobile station 8 collects audio information by a microphone 88 or converts input data from an input terminal 89 into transmissible data, performs channel encoding of the data by a mobile-station channel encoding section 90, conducts spread modulation of the data by a mobile-station modulating section 91, amplifies the data by a mobile-station transmitting section 92, and transmits the data as a upward wave 102 from a mobile-station transmitting antenna 93. In this connection, the mobile-station transmitting section 92 may include a D/A converter and a frequency conversion section converting a frequency into a carrier frequency.

Since the upward radio wave 102 receives influences from the propagation channel 100 such as multipath conditions, channel interference, and noise, reception characteristics are deteriorated due to these influences from the propagation channel 100.

A base station 7 converts, when a base-station antenna 75 receives the upward radio wave 102, the wave 102 into an electric signal and then amplifies the signal by a base-station receiving section 76 for reception. Incidentally, the base-station receiving section 76 may include an A/D converter and a frequency conversion section converting a frequency into a baseband frequency.

In the amplified signal, a base-station multipath timing detecting section 77 detects multipath timings by use of a known pilot signal, and a base-station finger rake section 78 conducts de-spreading and rake combining by use of the multipath timings such that a base-station channel decoding section 79 conducts channel decoding to send the channel-decoded signal to a network.

In the CDMA wireless apparatus described above, orthogonality of codes is lost due to multipath conditions of the propagation channel 100, leading to deterioration in the received signal characteristic. Patent article 1: Japanese Patent Laid-Open Pub. No. Hei-11-239082

DISCLOSURE OF THE INVENTION

Problem to be Solved by the Invention

In the conventional CDMA wireless apparatus described above, there occurs the multipath interference due to the influence from the multipath on the propagation channel, and hence there exists a problem that the reception characteristic is deteriorated by the multipath interference.

It is therefore an object of the present invention to provide a mobile communication system and a wireless apparatus to be used for the system capable of improving the reception characteristics using a small circuit size and low power consumption, thereby removing the above problem.

Means for Solving the Problem

A first mobile communication system in accordance with the present invention is a mobile communication system comprising a wireless apparatus including multipath timing detecting means for detecting multipath timings in a received signal using a known signal, wherein: the wireless apparatus comprises channel vector estimating means for estimating channel vectors according to the multipath timings detected by the multipath timing detecting means; channel matrix generating means for arranging the channel vectors estimated by the channel vector estimating means, in a preset method according to the multipath timings, to thereby generate a Channel matrix; weight calculating means for calculating a filter weight using the Channel matrix generated by the channel matrix generating means, and one or more equalizers for equalizing the received using the filter weight calculated by the weight calculating means; the channel vector estimating means estimates channel vectors at the multipath timing and a number of channel vectors in the neighborhood of the multipath timing; and the channel matrix generating means generates the Channel matrix using the channel vectors at the multipath timings and the number of channel vectors in the neighborhood of the multipath timings.

A second mobile communication system in accordance with the present invention is first mobile communication system comprising a wireless apparatus including one or more equalizers for equalizing a received signals, wherein the wireless apparatus comprises: channel state estimating means for estimating a channel state according to the received signals, judging means for judging, according to the channel state estimated by the channel state estimating means, whether equalization by each equalizer is needed for the channel condition; and selecting means for operating each equalizer to equalize the received signal when the judging means determines that the equalization by each equalizer is needed for the channel condition, and suppressing the equalization for the received signals when the judging means determines that the equalization by each equalizer is not required needed for the channel condition.

A third mobile communication system in accordance with the present invention is the first or second mobile communication system comprising a wireless apparatus including one or more equalizers for equalizing received signals and multipath timing detecting means for detecting multipath timings in a received signal using a known signal, wherein: the wireless apparatus comprises channel judging means for judging, according to the multipath timings detected by the multipath timing detecting means and based on a multipath state, whether equalization by each equalizer is needed for the a channel condition; and selecting means for operating each equalizer to equalize the received signals when the judging means determines that the equalization by each equalizer is needed for the channel condition, and suppressing the equalization for the received signals when the judging means determines that the equalization by each equalizer is not needed for the channel condition.

A fourth mobile communication system in accordance with the present invention is a mobile communication system comprising a wireless apparatus including multipath timing detecting means for detecting multipath timings in a received signal using a known signal and conducting communication using a Code Division Multiple Access (CDMA), wherein: the wireless apparatus comprises channel vector estimating means for estimating channel vectors according to the plural multipath timings detected by the multipath timing detecting means; channel matrix generating means for arranging the channel vectors estimated by the channel vector estimating means, in a preset method according to the multipath timings, to thereby generate a Channel matrix; weight calculating means for calculating a filter weight using the Channel matrix generated by the channel matrix generating means, one or more equalizers for equalizing the received signals using the filter weight calculated by the weight calculating means, and finger rake means for conducting ordinary reception according to the multipath timings detected by the multipath timing detecting means; and the channel vector estimating means estimates channel vectors of the multipath timings and a number of channel vectors in the neighborhood of the multipath timings; and the channel matrix generating means generates the Channel matrix using the channel vectors of the multipath timings and the number of channel vectors in the neighborhood of the multipath timings.

A fifth mobile communication system in accordance with the present invention is the fourth mobile communication system comprising a wireless apparatus including one or more equalizers for equalizing received signals and conducting communication using a Code Division Multiple Access (CDMA), wherein the wireless apparatus comprises: channel state estimating means for estimating a channel state according to the received signals, judging means for judging, according to the channel state estimated by the channel state estimating means, whether equalization by each equalizer is required for the channel condition; and selecting means for operating each equalizer to equalize the received signals when the judging means determines that the equalization by each equalizer is needed for the channel condition, and making the received signal pass finger rake means to thereby suppress the equalization by each equalizer.

A sixth mobile communication system in accordance with the present invention is the fourth or fifth mobile communication system comprising a wireless apparatus including one or more equalizers for equalizing received signals and multipath timing detecting means for detecting multipath timings in a received signal using a known signal and conducting communication using a Code Division Multiple Access (CDMA), wherein: the wireless apparatus comprises: channel judging means for judging, according to the multipath timings detected by the multipath timing detecting means, whether equalization by each equalizer is needed for a channel condition; and selecting means for operating each equalizer to equalize the received signals when the judging means determines that the equalization by each equalizer is needed for the channel condition, and making the received signals pass finger rake means to suppress the equalization by each equalizer.

A seventh mobile communication system in accordance with the present invention is one of the fourth to sixth mobile communication systems comprising a wireless apparatus including one or more equalizers for equalizing received signals and conducting communication using a Code Division Multiple Access (CDMA), wherein:

the wireless apparatus comprises channel judging means for judging, according to a criterion that at least the number of codes to be multiplexed is equal to or more than a fixed value, whether equalization by each equalizer is needed for a channel condition;

and selecting means for operating each equalizer to equalize the received signals when the judging means determines that the equalization by each equalizer is needed for the channel condition, and making the received signals pass finger rake means to suppress the equalization by each equalizer.

A first wireless apparatus in accordance with the present invention is a wireless apparatus including multipath timing detecting means for detecting multipath timings in a received signal using a known signal, comprising:

channel vector estimating means for estimating channel vectors according to the multipath timings detected by the multipath timing detecting means; channel matrix generating means for arranging the channel vectors estimated by the channel vector estimating means, in a preset method according to the multipath timings, to thereby generate a Channel matrix; weight calculating means for calculating a filter weight using the Channel matrix generated by the channel matrix generating means, and one or more equalizers for equalizing the received signal using the filter weight calculated by the weight calculating means, wherein: the channel vector estimating means estimates channel vectors at the multipath timings and a number of channel vectors in the neighborhood of the multipath timings; and the channel matrix generating means generates the Channel matrix using the channel vectors at the multipath timings and the number of channel vectors in the neighborhood of the multipath timings.

A second wireless apparatus in accordance with the present invention is the first wireless apparatus comprising one or more equalizers for equalizing received signals, comprising: channel state estimating means for estimating a channel state according to the received signals, judging means for judging, according to the channel state estimated by the channel state estimating means, whether equalization by each equalizer is needed for a channel condition; and selecting means for operating each equalizer to equalize the received signals when the judging means determines that the equalization by each equalizer is needed for the channel condition, and suppressing the equalization for the received signals when the judging means determines that the equalization by each equalizer is not needed for the channel condition.

A third wireless apparatus in accordance with the present invention is the first or second wireless apparatus comprising one or more equalizers for equalizing received signals and multipath timing detecting means for detecting multipath timings in a received signal using a known signal, comprising: channel judging means for judging, according to the multipath timings detected by the multipath timing detecting means and based on a multipath state, whether equalization by each equalizer is needed for a channel condition; and selecting means for operating each equalizer to equalize the received signals when the judging means determines that the equalization by each equalizer is needed for the channel condition, and suppressing the equalization for the received signals when the judging means determines that the equalization by each equalizer is not needed for the channel condition.

A fourth wireless apparatus in accordance with the present invention is a wireless apparatus comprising multipath timing detecting means for detecting multipath timings in a received signal using a known signal and conducting communication using a Code Division Multiple Access (CDMA), comprising: channel vector estimating means for estimating channel vectors according to the multipath timings detected by the multipath timing detecting means; channel matrix generating means for arranging the channel vectors estimated by the channel vector estimating means, in a preset method according to the multipath timings, to thereby generate a Channel matrix; weight calculating means for calculating a filter weight using the Channel matrix generated by the channel matrix generating means, one or more equalizers for equalizing the received signals using the filter weight calculated by the weight calculating means, and finger rake means for conducting ordinary reception according to the multipath timings detected by the multipath timing detecting means; wherein: the channel vector estimating means estimates channel vectors of the multipath timings and a number of channel vectors in the neighborhood of the multipath timings; and the channel matrix generating means generates the Channel matrix using the channel vectors of the multipath timings and the number of channel vectors in the neighborhood of the multipath timings.

A fifth wireless apparatus in accordance with the present invention is fourth wireless apparatus comprising one or more equalizers for equalizing received signals and conducting communication using a Code Division Multiple Access (CDMA), comprising: channel state estimating means for estimating a channel state according to the received signals, judging means for judging, according to the channel state estimated by the channel state estimating means, whether equalization by each equalizer is needed for a channel condition; and selecting means for operating each equalizer to equalize the received signals when the judging means determines that the equalization by each equalizer is needed for the channel condition, and making the received signal pass finger rake means to thereby suppress the equalization by each equalizer.

A sixth wireless apparatus in accordance with the present invention is the fourth or fifth wireless apparatus comprising one or more equalizers for equalizing a received signal and multipath timing detecting means for detecting multipath timings in received signals using a known signal and conducting communication using a Code Division Multiple Access (CDMA), comprising: channel judging means for judging, according to the multipath timings detected by the multipath timing detecting means, whether equalization by each equalizer is needed for a channel condition; and selecting means for operating each equalizer to equalize the received signals when the judging means determines that the equalization by each equalizer is needed for the channel condition, and making the received signals pass finger rake means to suppress the equalization by each equalizer.

A seventh wireless apparatus in accordance with the present invention is one of the fourth to sixth wireless apparatus comprising one or more equalizers for equalizing received signals and conducting communication using a Code Division Multiple Access (CDMA), comprising: channel judging means for judging, according to a criterion that at least the number of codes to be multiplexed is equal to or more than a fixed value, whether equalization by each equalizer is needed for a channel condition; and selecting means for operating each equalizer to equalize the received signals when the judging means determines that the equalization by each equalizer is needed for the channel condition, and making the received signals pass finger rake means to suppress the equalization by each equalizer.

That is, the first mobile communication system in accordance with the present invention comprises multipath timing detecting means for detecting multipath timings, channel matrix generating means to be used to generate a Channel matrix for an equalizer by estimating a channel characteristic according to the multipath timings, and weight calculating means for calculating an equalizing filter weight using the matrix. The channel matrix generating means uses not only the propagation channel of the multipath timings, but also propagation channels in the neighborhood of its position.

The second mobile communication system in accordance with the present invention comprises channel estimating means for conducting, for the state of the received signals, at least one of estimation of a Signal to Interference power Ratio (SIR), estimation of a Signal to Noise power Ratio (SNR), estimation of a signal to noise interference power ratio, estimation of a multipath number, estimation of a multipath interval, and estimation of a delay deviation; judging means for judging whether an equalizer is needed according to, for example, whether the estimated value is equal to or more than a preset threshold value; and selecting means for operating the equalizer to make the received signals pass the equalizing filter when the equalizer is required for a channel condition, and for making the received signals to detour the equalizing filter when the equalizer is not needed for the channel condition and for stopping operation of the equalizer.

The third mobile communication system in accordance with the present invention comprises channel judging means for judging whether the channel state is suitable for an equalizer by comparing the number and the interval of the multipath timings outputted from the multipath timing detecting means with preset threshold values, and selecting means for stopping, according to the judgment, the equalizer when the channel condition is not suitable for operation of the equalizer.

The fourth mobile communication system in accordance with the present invention operates in a communication system of an Code Division Multiple Access (CDMA) system and comprises multipath timing detecting means for supplying multipath timings to both of finger rake receiving means for ordinary reception and equalizing means for equalizing reception, and selecting means for selectively using the equalizing means and the finger rake receiving means.

The fifth mobile communication system in accordance with the present invention comprises multipath timing detecting means for detecting multipath timings and channel matrix generating means to be used to generate a Channel matrix for an equalizer by estimating a channel characteristic of the multipath timings, and weight calculating means calculates a weight for the equalizing filter using the matrix. The channel matrix generating means uses not only the propagation channel of the multipath timings, but also propagation channels in the neighborhood of the timing.

The sixth mobile communication system in accordance with the present invention operates in a communication system of a Code Division Multiple Access (CDMA) system and comprises multipath timing detecting means for supplying timing to the fingers used in the finger rake reception, detection judging means for detecting the state of the received signals through SIR detection or the like, and selecting means for making an equalizer effective when the SIR is equal to or more than an arbitrary threshold value and stopping the equalizer and making the finger rake reception effective when the SIR is equal to or less than an arbitrary threshold value.

The seventh mobile communication system in accordance with the present invention comprises channel estimating means for conducting, for the state of the received signals, at least one of estimation of the SIR, estimation of the SNR, estimation of the signal to noise interference power ratio, estimation of the multipath number, estimation of the multipath interval, and estimation of the delay deviation; judging means for judging whether an equalizer is needed, according to, for example, whether the estimated value is equal to or more than a preset threshold value; and selecting means for operating the equalizer for making the received signals pass the equalizing filter when the equalizer is needed for a channel condition, and for making the received signals to detour the equalizing filter when the equalizer is not needed for the channel condition and for stopping operation of the equalizer.

The eighth mobile communication system in accordance with the present invention comprises channel judging means for judging whether the channel state is suitable for an equalizer by comparing the number and the interval of the multipath timings outputted from the multipath timing detecting means with preset threshold values, and selecting means for stopping, according to the judgment, the equalizer when the channel condition is not suitable for operation of the equalizer.

The ninth mobile communication system in accordance with the present invention operates in a communication system of the CDMA system and comprises multipath timing detecting means for supplying multipath timings to both of finger rake receiving means for ordinary reception and equalizing means for equalizing reception, and selecting means for selectively using the equalizing means and the finger rake receiving means.

As a result, the mobile communication system in accordance with the present invention is capable of reducing the amount of calculation of the equalizing weight by use of the multipath timings in the calculation of an equalizer and hence is capable of improving the characteristic with a small amount of calculation.

Also, since the mobile communication system in accordance with the present invention uses the same multipath timing detecting section in the normal reception finger rake and an equalizer in the case of CDMA, it is possible to improve the characteristic with a small amount of calculation.

Additionally, in the mobile communication system in accordance with the present invention, the state of the propagation channel is judged by the channel state estimating section, the judging section, the channel estimating section, and the selecting section such that the operation of an equalizer is ceased in the propagation channel that does not bring about much benefit of the equalization such as a propagation channel with large noise or unknown disturbing waves or a propagation channel with little influence of the multipath interference. Consequently, it is possible to reduce the amount of ineffective calculation.

Furthermore, in the mobile communication system in accordance with the present invention, the state of the propagation channel is judged by the channel state estimating section, the judging section, the channel estimating section, and the selecting section such that the system does not activate an equalizer in the propagation channel that brings about little benefit of the equalization such as a propagation channel in which the characteristic is likely to be deteriorated by the equalizer, a propagation channel with large noise or unknown disturbing waves, or a propagation channel with little influence of the multipath interference. Consequently, it is possible to reduce the characteristic deterioration brought by the equalizer.

Advantages of the Invention

The present invention leads, through the following configuration and operation, to an advantage of improvement of the reception characteristic with a small circuit size and low consumption power.

BEST MODE FOR CARRYING OUT THE INVENTION

Next, description will be given of an embodiment of the present invention by referring to drawings. FIG. 2 is a block diagram showing a configuration of a mobile communication system in a first embodiment of the present invention. In FIG. 2, the mobile communication system in the first embodiment of the present invention includes a base station 1 and a mobile station 2, and the mobile station 1 and the mobile station 2 communicate via a propagation channel 100 with each other.

The base station 1 includes a channel encoding section 11, a base-station modulating section 12, a base-station transmitting section 13, a base-station transmitting antenna 14, a base-station receiving antenna 15, a base-station receiving section 16, a base-station multipath timing detecting section 17, one or more equalizers 18, a base-station demodulating section 19, and a base-station channel decoding section 20.

The mobile station 2 includes a mobile-station receiving antenna 21, a mobile-station receiving section 22, a mobile-station multipath timing detecting section 23, one or more equalizers 24, a mobile-station demodulating section 25, a mobile-station channel decoding section 26, a speaker 27, a display section 28, a microphone 29, an input terminal 30, a mobile-station channel encoding section 31, a mobile-station modulating section 32, a mobile-station transmitting section 33, and a mobile-station transmitting antenna 34.

The base-station multipath timing detecting section 17 and the mobile-station multipath timing detecting section 23 detect multipath timings using known pilot signals in output signals from the base-station receiving section 16 and the mobile-station receiving section 22. Moreover, the equalizers 18 and 24 are not required to be in a pair in the base station 1 and the mobile station 2 and may be disposed in both of or either one of the base station 1 and the mobile station 2.

FIG. 3 is a block diagram showing a configuration of an equalizer 18. In FIG. 3, the equalizer 18 of the base station 1 includes a channel vector estimating section 181, a noise estimating section 182, a channel matrix generating section 183, a weight calculating section 184, and an equalizing filter 185. Incidentally, an equalizer 248 of the mobile station 2 is configured in the same way as the equalizer 18.

The channel vector estimating section 181 estimates channel vectors. Methods for the estimation is as follows: according to the multipath timings sent from the base-station multipath timing detecting section 17, the section 181 multiplies an input signal from the base-station receiving section 16 by a complex conjugate of a known pilot signal and calculates the average; or in the case of the Code Division Multiple Access (CDMA), the section 181 de-spreads the pilot signal and calculates the average.

The noise estimating section 182 estimates noise power using a received signal, and the channel matrix generating section 183 generates a Channel matrix by arranging the channel vectors estimated by the channel vector estimating section 181, according to the multipath timings.

The weight calculating section 184 calculates a weight matrix using the noise estimation values from the noise estimating section 182 and the Channel matrix from the channel matrix generating section 183 to set the obtained filter weight vectors to the equalizing filter 185.

FIG. 4 is a block diagram showing a configuration of the equalizing filter 185. In FIG. 4, the equalizing filter 185 indicates an example of a Finite Impulse Response (FIR) filter. The equalizing filter 185 includes a shift register group 1851 including M shift registers (D) to which an input signal to the equalizing filter 185 is inputted, a weight multiplying section 1852 including (M+1) multiplying sections to multiply filter weight values (W0 to WM) by the respective shift register outputs, and an adding section ($\Sigma$) 1853. M indicates the number of taps.

In the present embodiment, a filter weight vector indicates (M+1) filter weight values (W0 to WM) to be multiplied by the weight multiplying section 1852. When each of IQ components of the complex filter are taken into consideration, the total of components is (M+1)×2. Also, a period of time which is one over the clock speed of the shift register group 1851 and corresponds to the time difference between the signals of the respective registers is represented as tap interval Ttap.

FIG. 5 is a schematic diagram for explaining a method of generating a Channel matrix in an embodiment of the present invention. Referring to these diagrams, i.e., FIGS. 2 to 5, description will be given of an operation of the mobile communication system in the first embodiment of the present invention.

Since this embodiment is not limited to CDMA, the base-station modulating section 12, the mobile-station modulating section 32, the base-station demodulating section 19, and the mobile-station demodulating section 25 conduct modulation and demodulation such as the Quadrature Phase Shift Keying (QPSK), the Quadrature Amplitude Modulation (QAM), the Frequency Shift Keying (FSK), the Gaussian filtered Minimum Shift Keying (GMSK), the Optical Frequency Division Multiplexing (OFDM) and the spread modulation.

In the received signals from the base-station receiving section 16 and the mobile-station receiving section 22, the multipath timings are detected using known pilot signals by the base-station multipath timing detecting section 17 and the mobile-station multipath timing detecting section 23; and then by use of the multipath timings, the influence from the propagation channel 100 is suppressed by the equalizers 18 and 24 to improve the reception characteristics; and the demodulation processing such as the QPSK demodulation, the QAM demodulation, the FSK demodulation, the GMSK demodulation, OFDM, or the spread demodulation is conducted by the base-station demodulating section 19 and the mobile-station demodulating section 25 to send the resultant signals to the base-station channel decoding section 20 and the mobile-station channel decoding section 26.

The base-station multipath timing detecting section 17 and the mobile-station multipath timing detecting section 23 respectively multiply complex conjugates of known pilot signals by the received signals to conduct averaging and the like to draw delay profiles represented by timing and power or amplitude information; and detects from the delay profiles multipath timings, the influences from the propagation channel 100.

In the detection, restrictions such as forward protection and backward protection are introduced depending on the maximum multipath number to be detected as parameters, the smallness of a multipath to be detected in the maximum path relative to the maximum multipath, the detection multipath interval, or whether the multipath timings are those detected previously.

In the examples shown in (a) and (b) of FIG. 5, first timing t0 having a large delay profile is detected as a multipath timing. The timing near tO is masked to keep a fixed detection path interval and then t1, the second largest delay profile, is detected.

This kind of function is set because if a neighborhood side robe is assigned to the finger rake section without restricting the path interval in the CDMA multipath timing detecting section or the like, the characteristics after the raking are deteriorated and a limited number of fingers are not appropriately assigned to the multipath. The multipath timings are timing information of each of the plural detected paths.

As shown in (a) of FIG. 5, the channel vector estimating section 181 multiplies, according to multipath timings t0 and t1 sent from the base-station multipath timing detecting section 17, or the mobile-station multipath timing detecting section 23, a complex conjugate of a known pilot signal by the signal from the base-station receiving section 16 or the mobile-station receiving section 22 to conduct averaging (de-spreads the pilot signal in the case of CDMA to conduct averaging) to thereby estimate channel vectors $h_0$ and $h_1$.

On the other hand, the noise estimating section 182 estimates noise using the power of the input signal and the difference or the ratio between and the power of the channel vectors before and after the averaging. The channel matrix generating section 183 arranges, as shown in (c) of FIG. 5, the estimated channel vectors $h_0$ and $h_1$ according to $\Delta n$ calculated using the path timing information t0 and t1 (sec) and the tap interval Ttap (sec) to generate a Channel matrix H.

The weight calculating section 184 calculates, using the noise estimation value and the Channel matrix, the weight matrix W:

$$W=(H^H H+\sigma^2 I)^{-1}H^H,$$

and sets to the equalizing filter 185 the filter weight vectors obtained by extracting vectors from the weight matrix W, such as a central row of the weight matrix W. In the expression, $\sigma^2$ is noise and I is a unitary matrix.

The above expression is used to calculate the weight of the equalizing filter 185 to suppress the multipath interference using the Minimum Mean Square Error (MMSE). This expression is described in detail, for example, in "Characteristic Comparison between Multipath Interference Canceller and Chip Equalizer in High Speed Downlink Packet Access (HSDPA)" (Technical Report of IEICE RCS2001-237) (Article 1).

Next, using (b) and (d) of FIG. 5, description will be given of an example in which the channel matrix generating section 183 also uses channel vectors in the vicinity of the multipath timings. Parameter Nca indicates the number of channel vectors used for one multipath timing. In the example shown in (a) of FIG. 5 described above, for one path of a multipath timing, there exists one channel vector, which is represented as Nca =1.

Subsequently, description will be given of a case of Nca=3 in which three channel vectors are used for one multipath timing. The channel vector estimating section 181 estimates, for multipath timing t0, three channel vectors $h_{0-}$, $h_0$, and $h_{0+}$, which are Ttap apart from each other. Also for multipath timing t1, the estimating section 181 estimates, in a similar manner as above, three channel vectors $h_{1-}$, $h_1$, and $h_{1+}$, which are Ttap apart from each other (reference is to be made to (b) of FIG. 5).

The channel matrix generating section 183 keeps an interval Δn between the channel vector $h_0$ and the channel vector $h_1$ and arranges the vectors as shown in (d) of FIG. 5 to generate the Channel matrix H.

Furthermore, (e) of FIG. 5 shows an example of the Channel matrix in a case of Nca=5 in which five channel vectors are used for one multipath timing. For each of the multipath timings of t0 and t1, there are inherently to be estimated five channel vectors $h_{0-2}$, $h_{0-}$, $h_0$, $h_{0+}$, $h_{0+2}$, $h_{1-2}$, $h_{1-}$, $h_1$, $h_{1+}$, and $h_{1+2}$ which are Ttap apart from each other. However, in this example, channel vectors $h_0$ and $h_1$ are apart from each other only by 4×Ttap (sec), and hence the path position of the channel vector $h_{0+2}$ is equal to that of channel vector $_{1-2}$ to overlap each other; that is, only one of the values is required to be used. In this case, only the channel vector $h_{0+2}$ is obtained.

FIG. 6 is a block diagram showing a configuration of a mobile communication system in a second embodiment of the present invention. The mobile communication system in the second embodiment of the present invention includes a base station 5 including an equalizing section 51 in place of a base-station multipath timing detecting section 17, an equalizer 18, and a base-station demodulating section 19, and a mobile station 6 including an equalizing section 61 in place of a mobile-station multipath timing detecting section 23, an equalizer 24, and a mobile-station demodulating section 25. In other than this point, the mobile communication system is equal in structure to the mobile communication system in the first embodiment of the present invention shown in FIG. 2. The same reference numerals are assigned to the same constituent components.

FIG. 7 is a block diagram showing a configuration of the equalizing section 51 of FIG. 6. In FIG. 7, the equalizing section 51 includes a multipath timing detecting section 511, one or more equalizers 512, a before-combination channel state estimating section 513, a judging section 514, selecting sections 515 and 516, and a demodulating section 517. Incidentally, a dotted-line arrow in FIG. 7 indicates a control signal. The equalizing section 61 of the mobile station 6 is equal in structure to the equalizing section 51 described above.

The multipath timing detecting section 511 detects multipath timings in a received signal using a known pilot signal to feed the multipath timings to an equalizer 512 and the before-combination channel state estimating section 513. The equalizer 512 conducts, by use of the multipath timings, an operation to suppress the influence of the propagation channel 100 from the received signals.

The before-combination channel state estimating section 513 estimates the channel state and conducts SIR estimation, SNR estimation, and estimation of a signal to noise interference power ratio. Or, the section 513 estimates the multipath number, the multipath interval, and the delay deviation.

For example, when the before-combination channel state estimating section 513 estimates SIR, if the SIR value is more than a predetermined threshold value, the judging section 514 determines that a channel condition is suitable for operation of the equalizer 512 and activates the equalizer 512 by the selecting sections 515 and 516 to control the received signals to pass an equalizing filter; and if the SIR value is less than the predetermined threshold value, the judging section 514 determines that the channel condition is not suitable for operation of the equalizer 512 and stops the operation of the equalizer 512 or makes the received signals take a detour not to pass the equalizing filter to thereby make the equalizer 512 ineffective.

As a result of the operation, if the propagation channel 100 has high noise and is not suitable for the equalizer operation, the operation of the equalizer 512 is stopped to avoid deterioration by the operation of the equalizer 512 in the unsuitable state; and by stopping the operation of the equalizer 512, it is possible to reduce the consumption power for useless operations of the equalizer 512. The demodulating section 517 conducts demodulation suitable for the wireless system such as the QPSK demodulation, the QAM demodulation, the FSK demodulation, the GMSK demodulation, or the spread demodulation.

FIG. 8 is a block diagram showing a configuration of the equalizing section 52 in a third embodiment of the present invention. The mobile communication system in the third embodiment of the present invention includes the equalizing section 52 disposed in place of the equalizing section 51. In other than this point, the mobile communication system is equal in structure to the mobile communication system in the second embodiment of the present invention shown in FIG. 6.

In FIG. 8, the equalizing section 52 includes a multipath timing detecting section 521, one or more equalizers 522, a channel judging section 523, selecting sections 524 and 525, and a demodulating section 526. Incidentally, a dotted-line arrow in FIG. 8 indicates a control signal and the equalizing section (not shown) of the mobile station in the third embodiment of the present invention is equal in structure to the equalizing section 52 described above.

In the embodiment, the multipath timings detected by the multipath timing detecting section 521 is inputted to an equalizer 522 and the channel judging section 523. The section 523 determines whether the multipath interference easily occurs, based on conditions that, for example, there exists a plurality of detected paths and at least one of the path intervals is less than a path interval threshold value which is a arbitrarily designated value.

Description will be given of the operation using (f) of FIG. 5. The embodiment is a 4-path multipath and t0, t1, t2, and t3, are transmitted as multipath timing. The multipath intervals Δt1 and Δt2 are more than the threshold value, but Δt3 is less than an interval determined as the threshold value, and hence it can be determined that the multipath interference likely occurs between the paths of t2 and t3.

The channel judging section 523 makes the equalizer 522 effective by use of the selecting sections 524 and 525 only in a channel state in which the multipath likely occurs and the advantage of the equalizer 522 is remarkable. As a result, the advantage of the equalizer is achieved in a propagation channel in which equalizer's advantage is present; and for a propagation channel in which the advantage cannot be expected, it is possible to reduce the consumption power of unnecessary operations of the equalizer 522.

FIG. 9 is a block diagram showing a configuration of the equalizing section 53 in a fourth embodiment of the present invention. The mobile communication system in the fourth embodiment of the present invention includes the equalizing section 53 disposed in place of the equalizing section 51 to implement a wireless system using CDMA. In other than this point, the mobile communication system is equal in structure to the mobile communication system in the second embodiment of the present invention shown in FIG. 6.

In FIG. 9, the equalizing section 53 includes a multipath timing detecting section 531, one or more equalizers 532, a de-spreading section 533, a finger rake section 534, a before-combination channel state estimating section 535, a judging section 536, and selecting sections 537 and 538. Incidentally, a dotted-line arrow in FIG. 9 indicates a control signal and the equalizing section (not shown) of the mobile station in the fourth embodiment of the present invention is equal in structure to the equalizing section 53 described above.

The multipath timing detecting section 531 detects multipath timings in the output signal from the base-station receiving section 16 using a known pilot signal to feed the detected multipath timings to an equalizer 532 for equalizing reception or the finger rake section 534 for ordinary reception and the before-combination channel state estimating section 535.

The equalizer 522 conducts, by use of the multipath timings, an operation to suppress the influence of the propagation channel from the received signals. Moreover, the finger rake section 534 includes a plurality of fingers and rakes such that the plural fingers de-spread the respective signals according to the multipath timings to remove the channel characteristic and the rakes combines a plurality of finger outputs with each other to thereby conduct multipath signal combination.

The before-combination channel state estimating section 535 estimates the channel state. To conduct the estimation, the section 535 conducts at least one of SIR estimation, SNR estimation, and estimation of a signal to noise interference power ratio.

For example, when the before-combination channel state estimating section 535 conducts SIR estimation to produce a result, if the SIR value is more than an arbitrary threshold value, the judging section 536 determines that the channel condition is suitable for operation of the equalizer 532 and makes the equalizer 532 effective by the selecting sections 537 and 538 and makes the finger rake section 534 ineffective.

Also, if the SIR value is less than the arbitrary threshold value, the judging section 536 stops the equalizer 532 and makes the finger rake section 534 effective. As a result of the operation, for the propagation channel which has high noise and is hence not suitable for the operation of the equalizer 532, the operation of the equalizer 532 is stopped to use the finger rake section 534. Consequently, it becomes possible to avoid deterioration caused by poor operations of the equalizer 532 in the unsuitable state and also to reduce the consumption power for the operation of the ineffective equalizer 532.

FIG. 10 is a block diagram showing a configuration of the equalizing section 54 in a fifth embodiment of the present invention. The mobile communication system in the fifth embodiment of the present invention includes the equalizing section 54 disposed in place of the equalizing section 51 to implement a wireless system using CDMA. In other than this point, the mobile communication system is equal in structure to the mobile communication system of the second embodiment of the present invention shown in FIG. 6.

In FIG. 10, the equalizing section 54 includes a multipath timing detecting section 541, one or more equalizers 542, a de-spreading section 543, an after-combination channel state estimating section 545, a judging section 546, and selecting sections 547 and 548. Incidentally, a dotted-line arrow in FIG. 10 indicates a control signal and the equalizing section (not shown) of the mobile station in the fifth embodiment of the present invention is equal in structure to the equalizing section 54 described above.

In the present embodiment, the after-combination channel state estimating section 545 is disposed after an equalizer 542 and the finger rake section 544. The section 545 estimates SIR using signals after the equalization and the de-spreading or the rake combination and hence does not require the multipath timings, and its functions are therefore simple. The other operations and advantages are similar to those of the fourth embodiment of the present invention described above.

FIG. 11 is a block diagram showing a configuration of the equalizing section 55 in a sixth embodiment of the present invention. The mobile communication system in the sixth embodiment of the present invention includes the equalizing section 55 disposed in place of the equalizing section 51 to implement a wireless system using CDMA. In other than this point, the mobile communication system is equal in structure to the mobile communication system of the second embodiment of the present invention shown in FIG. 6.

In FIG. 11, the equalizing section 55 includes a multipath timing detecting section 551, an equalizer 552, a de-spreading section 553, a channel judging section 555, and selecting sections 556 and 557. Incidentally, a dotted-line arrow in FIG. 11 indicates a control signal and the equalizing section (not shown) of the mobile station in the sixth embodiment of the present invention is equal in structure to the equalizing section 55 described above.

In the present embodiment, multipath timings detected by the multipath timing detecting section 551 is fed to the equalizer 552 and the channel judging section 555. The section 555 determines, like the channel judging section 523 of the third embodiment of the present invention described above, likeliness of occurrence of the multipath interference according to the multipath timings, and makes the equalizer 552 effective by use of the selecting sections 524 and 525 only in a channel state in which the multipath likely occurs and the advantage of the equalizer 522 is remarkable. Otherwise the section 555 stops the equalizer 552 and makes the finger rake section 554 effective in a channel state in which the multipath interference rarely occurs and the advantage of the equalize 552 is small. As a result, the advantage of the equalizer 552 can be obtained in a propagation channel in which the advantage is present. For a propagation channel in which the advantage cannot be expected, it is possible to reduce the consumption power for unnecessary operations of the equalizer 522.

FIG. 12 is a block diagram showing a configuration of the equalizing section 56 in a seventh embodiment of the present invention. The mobile communication system in the seventh embodiment of the present invention includes the equalizing section 56 disposed in place of the equalizing section 51 to implement a wireless system using CDMA. In other than this point, the mobile communication system is equal in structure to the mobile communication system of the second embodiment of the present invention shown in FIG. 6.

In FIG. 12, the equalizing section 56 includes a multipath timing detecting section 561, one or more equalizer 562, a de-spreading section 563, a finger rake section 564, a code number judging section 565, and selecting sections 566 and 567. Incidentally, a dotted-line arrow in FIG. 12 indicates a control signal and the equalizing section (not shown) of the mobile station in the seventh embodiment of the present invention is equal in structure to the equalizing section 56 described above. The code number judging section 565 judges the code number, and makes an equalizer 562 effective if the number of codes is large and makes the equalizer 562 ineffective if the number of codes is small.

FIG. 13 is a schematic diagram for explaining a known pilot signal that is used by the base-station multipath timing detecting section and the mobile-station multipath timing detecting section. In FIG. 13, the base-station multipath timing detecting section and the mobile-station multipath timing detecting section use a known signal called "pilot signal". However, as shown in (a) and (b) of FIG. 13, in communication systems such as those of the Time Division Multiple Access (TDMA), the Frequency Division Multiple Access (FDMA), GMSK, the Optical Frequency Division Multiplexing (OFDM), and CDMA, the pilot signal is inserted (201, 203, 205, and 207 of FIG. 13) in the form in which the pilot signal is time-multiplexed in other signals (202, 204, 206, and 208 of FIG. 13) such as data signals and the like.

Furthermore, in the CDMA, the codes are multiplexed as shown in FIG. 13(c). The code channels are allocated, for example, as follows: Ch1 is a pilot channel 209, Ch2 is a control channel 210 to send control information, and Ch3, Ch4, and Ch5 are data channels (211, 212, 213). In this situation, since the number of data channels varies depending on the number of users and traffic at that point of time, the number of codes to be used changes. The code number judging section 565 switches "effective" between "ineffective" for the equalizer according to the change in the number of codes.

In the fourth to seventh embodiments of the present invention described above, the output from the multipath timing detecting section is commonly used in both of the equalizer and the finger rake section. This leads to an advantage of reduction in the circuit size.

As above, in the present invention, since the amount of computation of the equalizing weight can be reduced by using the multipath timings for the calculation in an equalizer, the characteristic can be improved with a small amount of computation.

Also, according to the present invention, in a case of a wireless system using CDMA, since the same multipath timing detecting section is used by the finger rake section and an equalizer for the ordinary reception, the characteristic can be improved using a small circuit size.

Additionally, in the present invention, the channel state is judged by the channel state estimating section, the judging section, the channel judging section, and the selecting sections to stop the operation of an equalizer in a propagation channel such as a propagation channel in which noise or an unknown disturbing waves is large or a propagation channel in which the influence from the multipath interference is small, where the advantage of the equalization is small. Hence it is possible to reduce the amount of computation that is less effective.

In addition, also in the present invention, the channel state is judged by the channel state estimating section, the judging section, the channel judging section, and the selecting sections. The operation of an equalizer is not activated even in a propagation channel in which the advantage of the equalization is small, the propagation channel being a propagation channel in which the characteristic may be lowered by the equalizer, a propagation channel in which noise or an unknown disturbing waves is large, or a propagation channel in which the influence from the multipath interference is small. Hence it is possible to reduce the deterioration of the characteristics caused by the equalizer.

INDUSTRIAL APPLICABILITY

The present invention is applicable to the portable telephone, the Personal-Handy-phone System (PHS), the portable telephone base station, the PHS base station, the wireless base station, and the like.

BRIEF DESCRIPTION OF DRAWINGS

[FIG. 1] Block diagram showing a configuration of a mobile communication system as a conventional example.

[FIG. 4] Block diagram showing a configuration of the equalizing filter of FIG. 2.

[FIG. 5] Schematic diagram for explaining a method of generating a Channel matrix in an embodiment of the present invention.

[FIG. 12] Block diagram showing a configuration of the equalizing section in a seventh embodiment of the present invention.

[FIG. 13] Schematic diagram for explaining a known pilot signal which is used by the base-station multipath timing detecting section and the mobile-station multipath timing detecting section.

Figure 2:
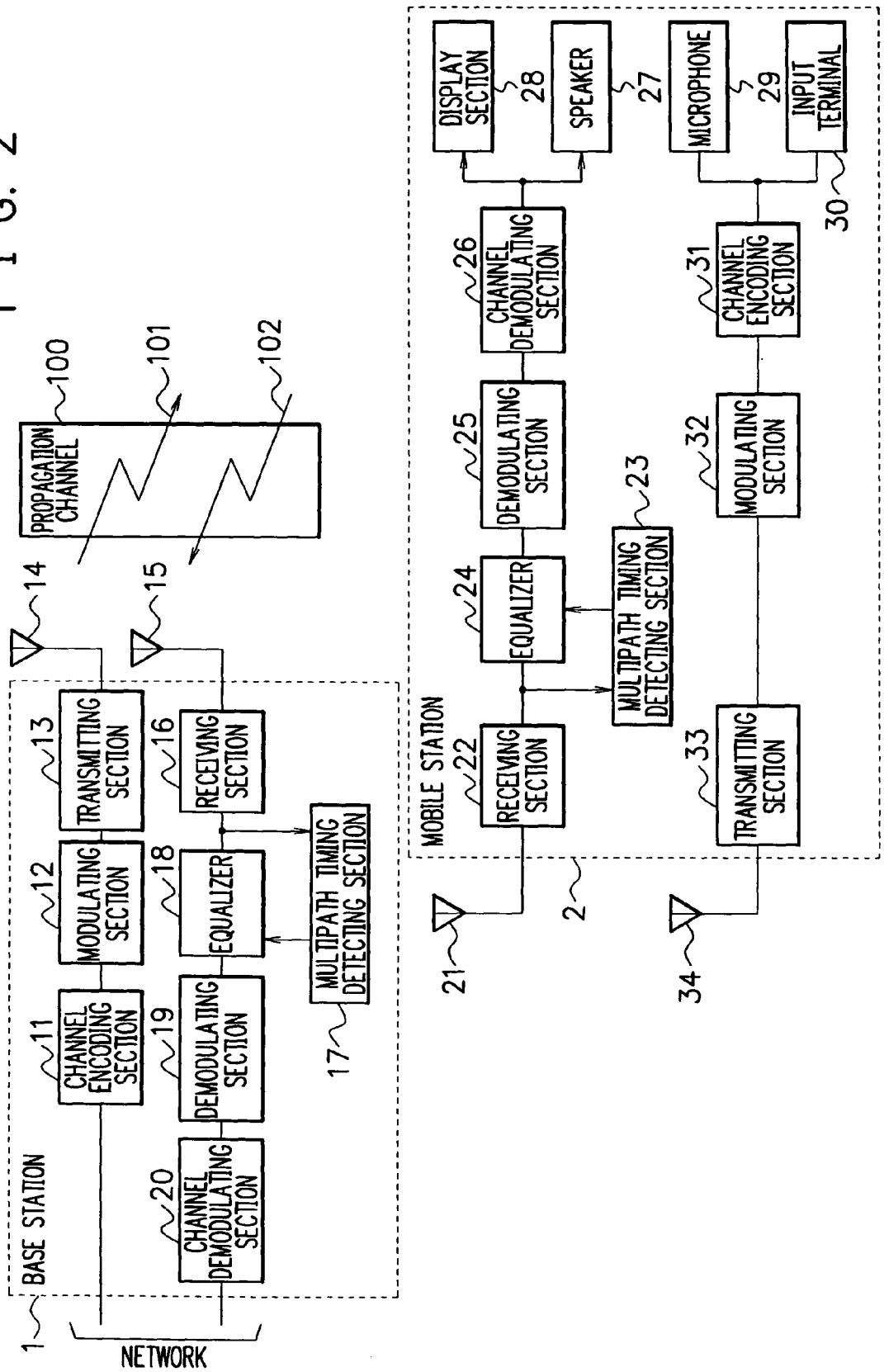
[FIG. 2] Block diagram showing a configuration of a mobile communication system in a first embodiment of the present invention.
Figure 3:
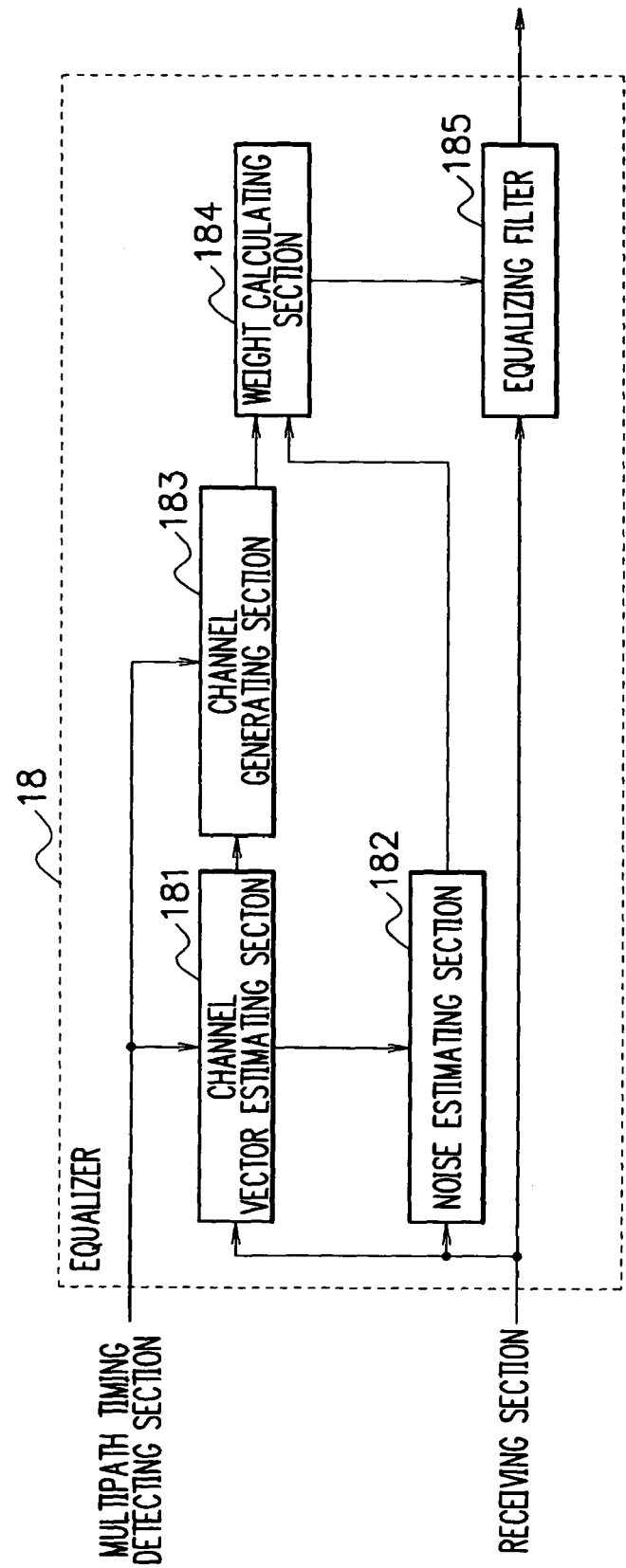
[FIG. 3] Block diagram showing a configuration of the equalizer of FIG. 1.
Figure 6:
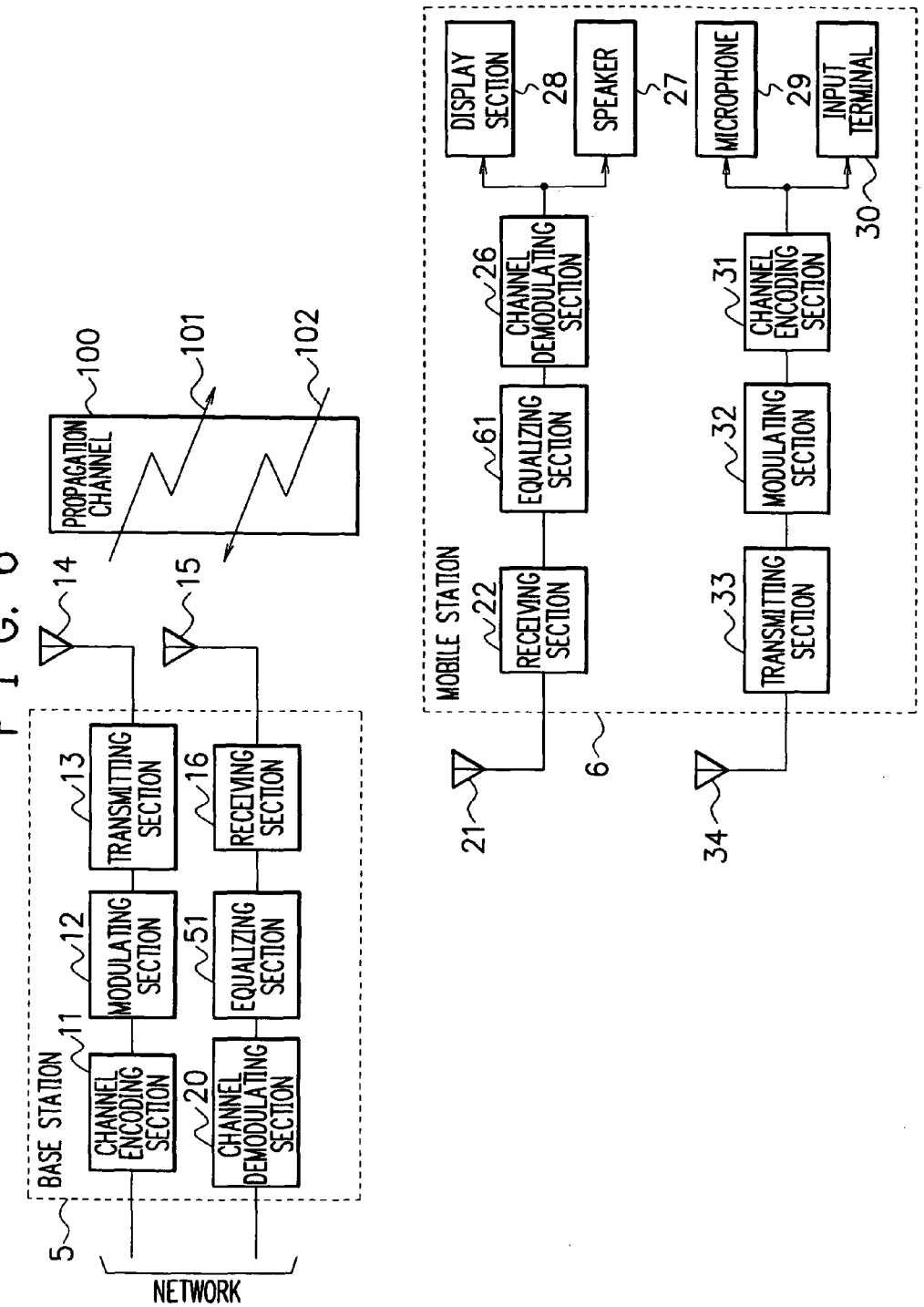
[FIG. 6] Block diagram showing a configuration of a mobile communication system in a second embodiment of the present invention.
Figure 7:
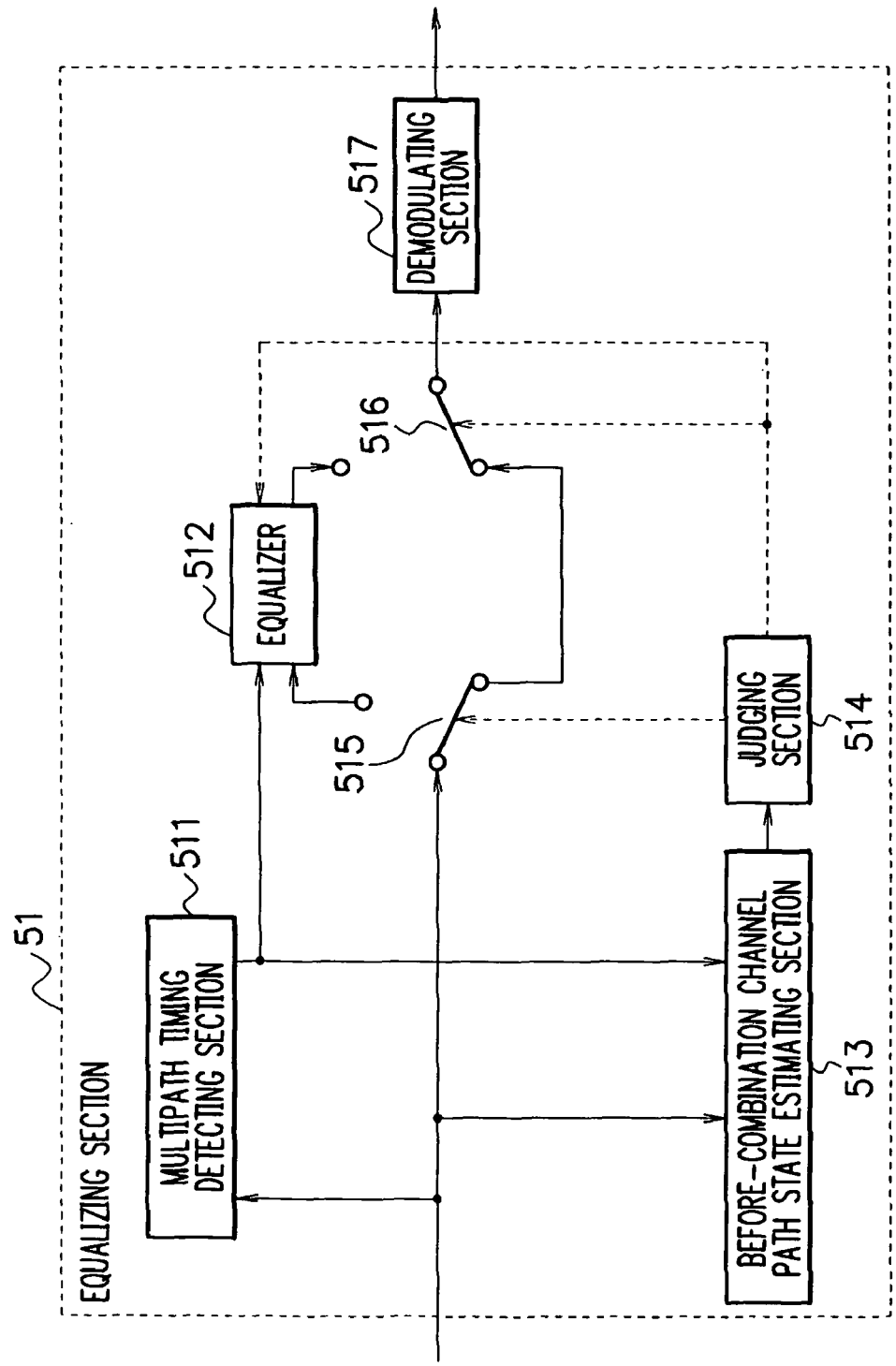
[FIG. 7] Block diagram showing a configuration of the equalizing section of FIG. 6.
Figure 8:
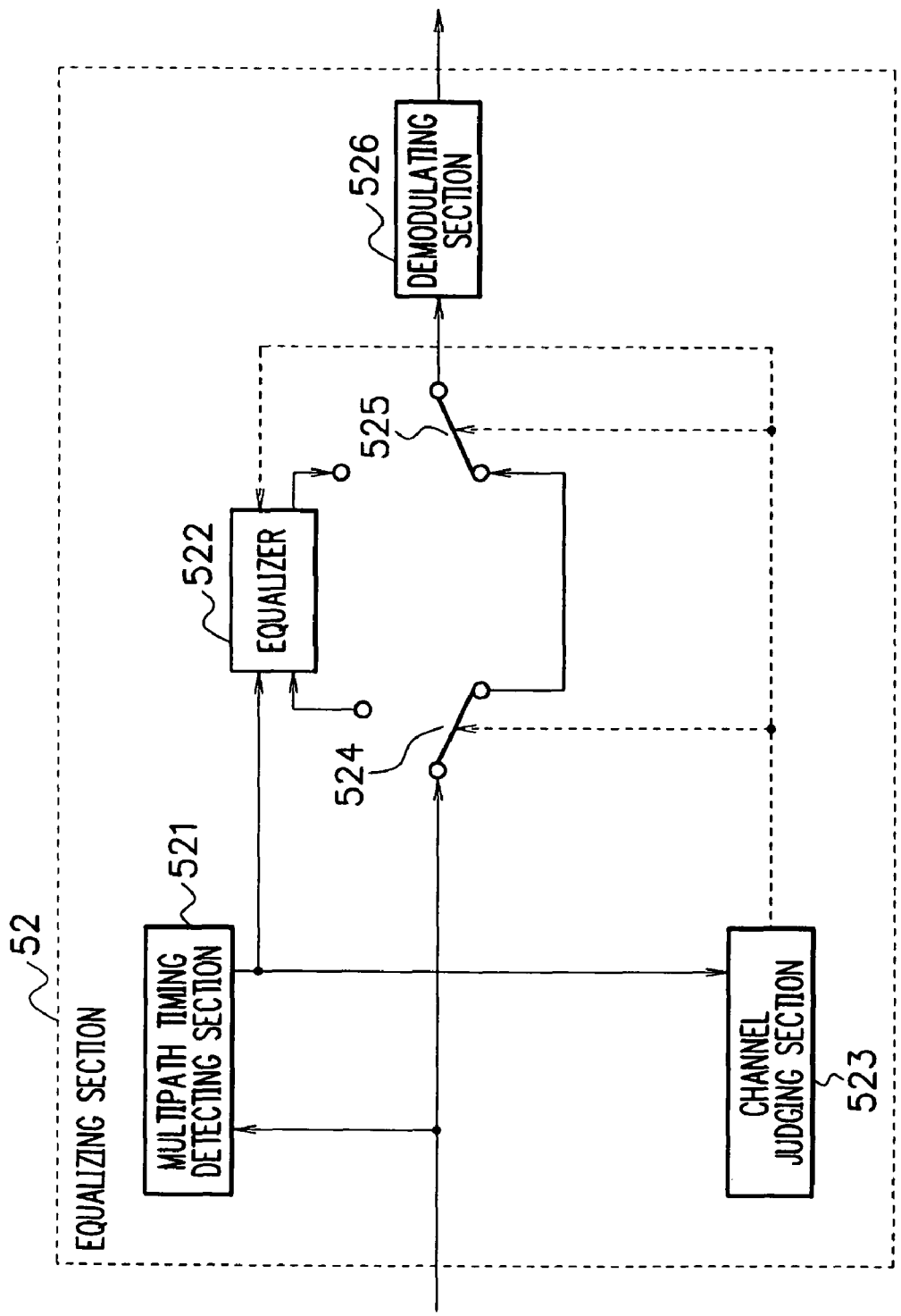
[FIG. 8] Block diagram showing a configuration of the equalizing section in a third embodiment of the present invention.
Figure 9:
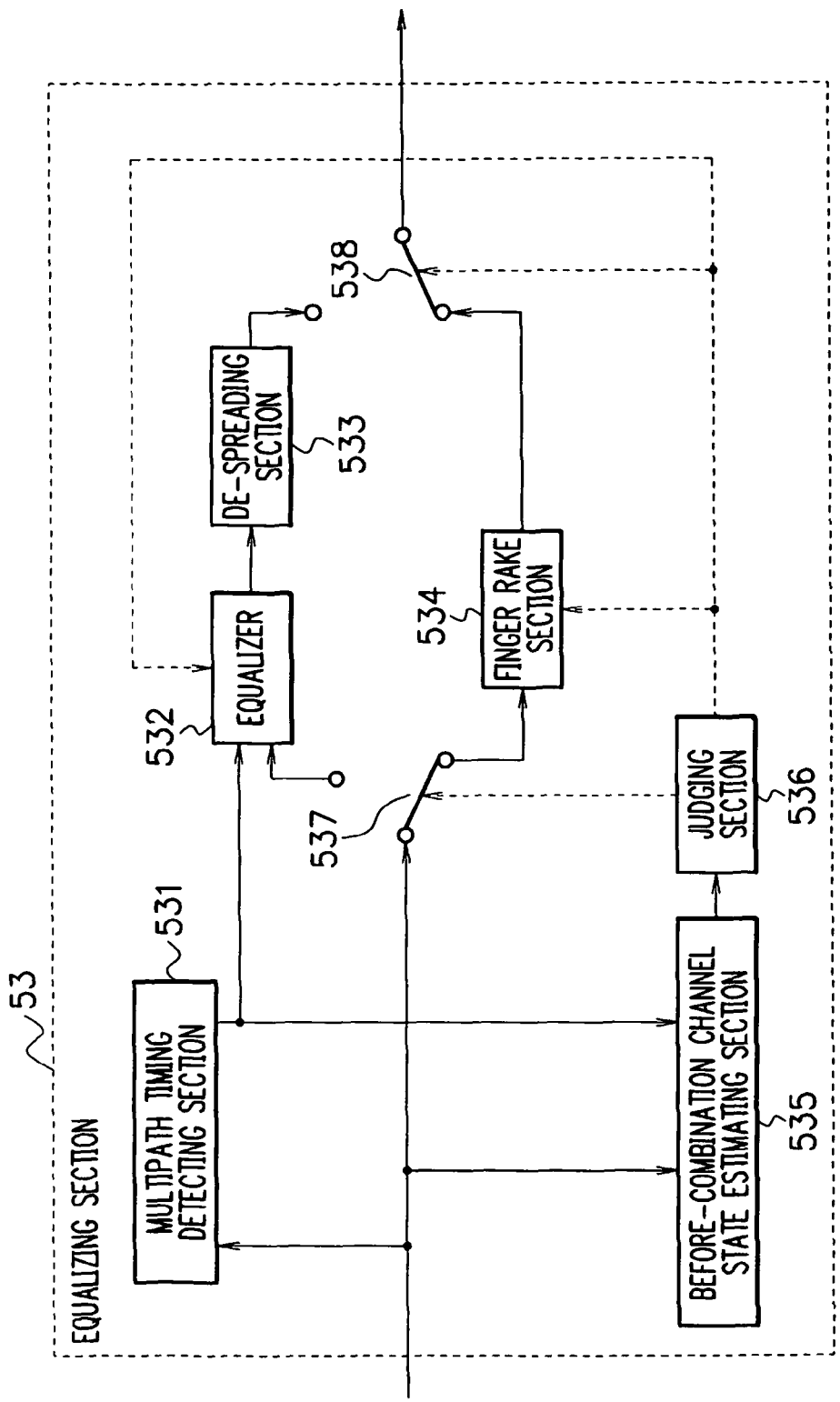
[FIG. 9] Block diagram showing a configuration of the equalizing section in a fourth embodiment of the present invention.
Figure 10:
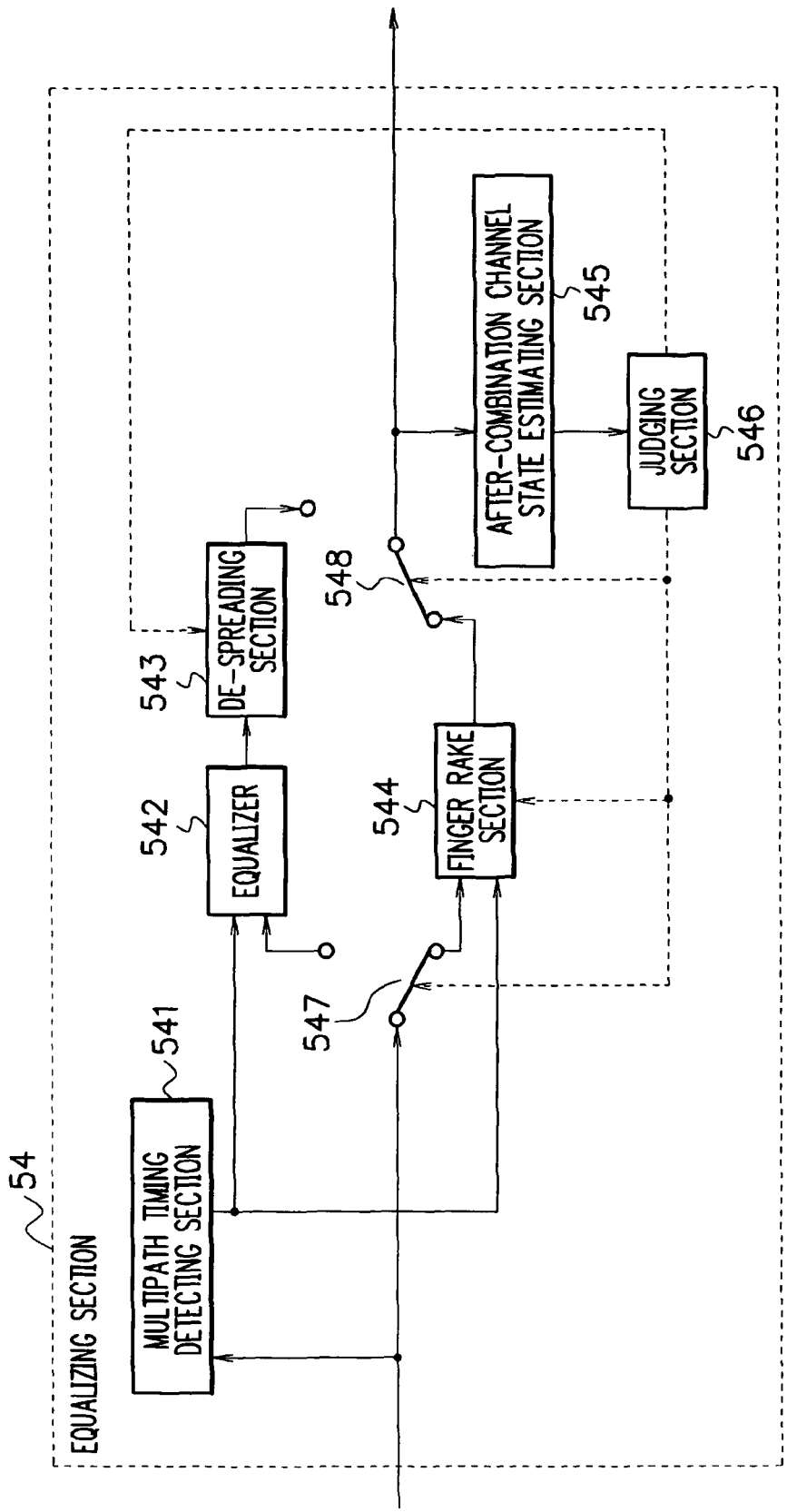
[FIG. 10] Block diagram showing a configuration of the equalizing section in a fifth embodiment of the present invention.
Figure 11:
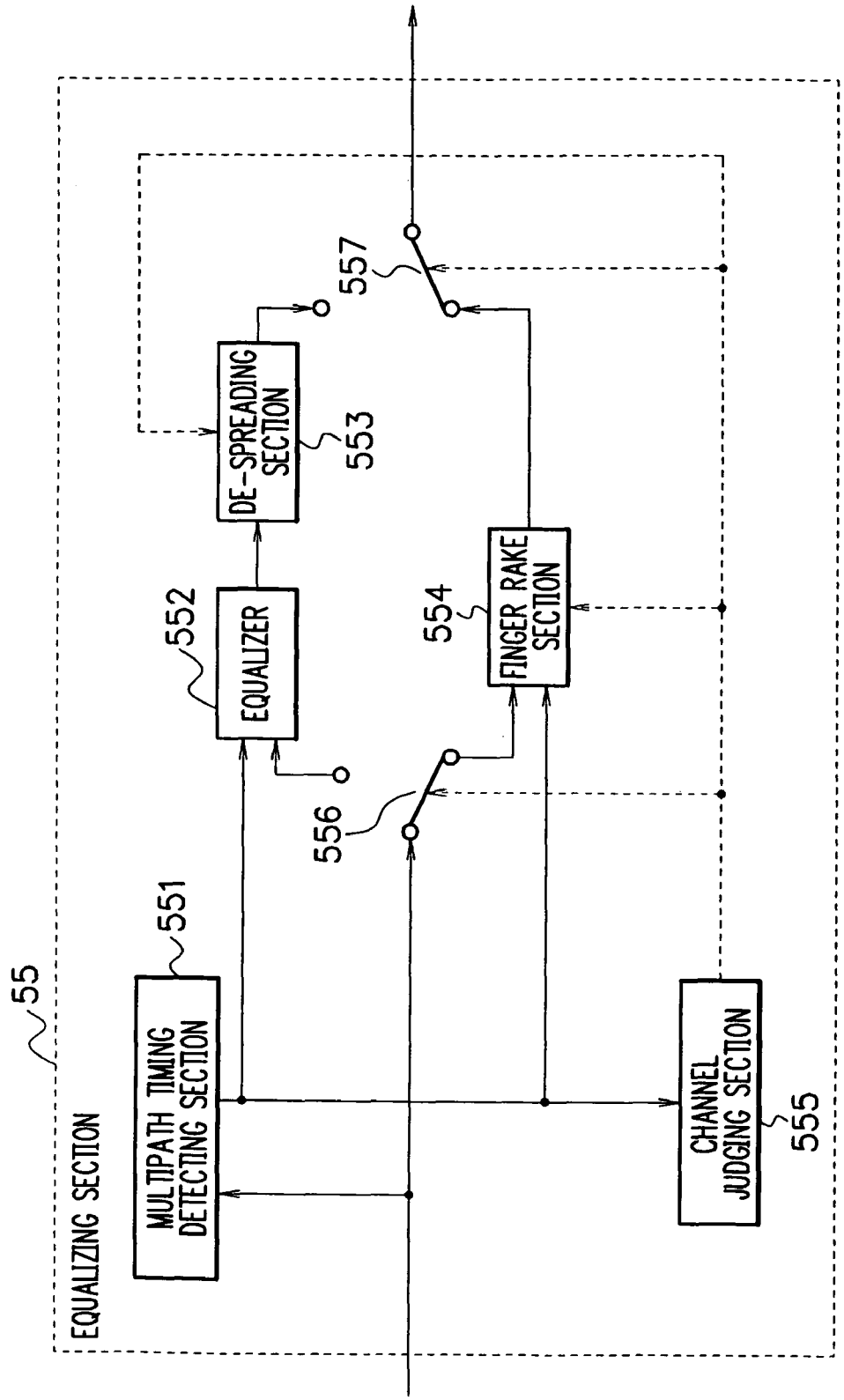
[FIG. 11] Block diagram showing a configuration of the equalizing section in a sixth embodiment of the present invention.

DESCRIPTION OF REFERENCE NUMERALS 1, 5 Base station
2, 6 Mobile station
11 Channel encoding section
12 Base-station modulating section
13 Base-station transmitting section
14 Base-station transmitting antenna
15 Base-station receiving antenna
16 Base-station receiving section
17 Base-station multipath timing detecting section
18, 24, 512, 522, 532, 542, 552, 562 Equalizer
19 Base-station demodulating section
20 Base-station channel decoding section
21 Mobile-station receiving antenna
22 Mobile-station receiving section
23 Mobile-station multipath timing detecting section 25 Mobile-station demodulating section
26 Mobile-station channel decoding section
27 Speaker
28 Display section
29 Microphone
30 Input terminal
31 Mobile-station channel encoding section
32 Mobile-station modulating section
33 Mobile-station transmitting section
34 Mobile-station transmitting antenna
51-56, 61 Equalizing section
100 Propagation channel
181 Channel vector estimating section
182 Noise estimating section
183 Channel matrix generating section
184 Weight calculating section
185 Equalizing filter
511, 521, 531, 541, 551, 561 Multipath timing detecting section
513, 535 Before-combination channel state estimating section
514, 536, 546 Judging section
515, 516, 524, 525, 537, 538, 547, 548, 556, 557, 566, 567 Selecting section
517, 526 Demodulating section
523 Channel judging section
533, 543, 553, 563 De-spreading section
534, 544, 554, 564 Finger rake section
545 After-combination channel state estimating section
555 Channel judging section
565 Code number judging section
1851 Shift register group
1852 Weight multiplying section
1853 Adding section

The invention claimed is:

1. A mobile communication system comprising a wireless apparatus including multipath timing detecting means for detecting a plurality of multipath timings in a received signal using a known signal, wherein:
the wireless apparatus comprises channel vector estimating means for estimating channel vectors according to the multi path timings detected by the multipath timing detecting means; channel matrix generating means for arranging the channel vectors estimated by the channel vector estimating means, in a preset method according to the multipath timings, to thereby generate a channel matrix; weight calculating means for calculating a filter weight using the channel matrix generated by the channel matrix generating means, and one or more equalizers for equalizing received signals using the filter weight calculated by the weight calculating means;
the channel vector estimating means estimates the channel vectors at the multipath timings and a number of channel vectors in the neighborhood of each of the multipath timings; and
the channel matrix generating means generates the channel matrix using the channel vectors at each of the multipath timings and the number of channel vectors in the neighborhood of the multipath timings.

2. A mobile communication system according to claim 1, wherein the number of channel vectors in the neighborhood of the multipath timings is an integer equal to or more than one.

3. A mobile communication system according to claim 1, wherein the channel matrix generating means further generates the channel matrix using the channel vectors at the multipath timings, the number of channel vectors in the neighborhood of each of the multipath timings, and zero.

4. A mobile communication system according to claim 1, further comprising:
transmission path state estimating means for estimating a channel state according to the received signals, judging means for judging, according to the channel state estimated by the channel state estimating means, whether equalization by each equalizer is required for a channel condition; and selecting means for operating each equalizer to equalize the received signals if the judging means determines that the equalization by each equalizer is required for the channel condition, and suppressing the equalization for the received signals if the judging means determines that the equalization by each equalizer is not required for the channel condition.

5. A mobile communication system according to claim 4, wherein the channel state estimating means estimates at least one of a signal to interference power ratio, a signal to noise power ratio, a signal to noise interference power ratio, and noise; and
the judging means determines that the equalization by each equalizer is required for the channel condition if the estimated value from the channel state estimating means is more than a predetermined value, and determines that the equalization by each equalizer is not required for the channel condition if the estimated value from the channel state estimating means is less than the predetermined value.

6. A mobile communication system according to claim 5, wherein:
the channel state estimating means estimates at least one of a multipath number, a multipath interval, and a delay deviation; and
the judging means determines, according to the estimated value from the channel state estimating means, whether the equalization by each equalizer is required for the channel condition.

7. A mobile communication system according to one of claim 1, wherein
the wireless apparatus comprises channel judging means for judging, according to the multipath timings detected by the multipath timing detecting means and based on a multipath state, whether equalization by each equalizer is required for the channel condition; and
selecting means for operating each equalizer to equalize the received signals if the judging means determines that the equalization by each equalizer is required for the channel condition, and suppressing the equalization for the received signals if the judging means determines that the equalization by each equalizer is not required for the channel condition.

8. A mobile communication system according to claim 7, wherein the channel judging means determines whether equalization by each equalizer is required for the channel condition, according to a criterion whether there exists a plurality of multipaths and whether an interval of the multipath is equal to or less than a fixed value.

9. A mobile communication system comprising a wireless apparatus including multipath timing detecting means for detecting a plurality of multipath timings in a received signal using a known signal and conducting communication using a Code Division Multiple Access (CDMA), wherein:
the wireless apparatus comprises channel vector estimating means for estimating channel vectors according to the multipath timings detected by the multipath timing detecting means; channel matrix generating means for arranging the channel vectors estimated by the channel vector estimating means, in a preset method according to the multipath timings, to thereby generate a channel matrix; weight calculating means for calculating a filter weight using the channel matrix generated by the channel matrix generating means, one or more equalizers for equalizing received signals using the filter weight calculated by the weight calculating means, and finger rake means for conducting reception according to the multipath timings detected by the multipath timing detecting means; and the channel vector estimating means estimates the channel vectors of the multipath timings and a number of channel vectors in the neighborhood of each of the multipath timings; and the channel matrix generating means generates the channel matrix using the channel vectors of the multipath timings and the number of channel vectors in the neighborhood of each of the multipath timings.

10. A mobile communication system according to claim 9, characterized in that the number of channel vectors in the neighborhood of the multipath timings is an integer equal to or more than one.

11. A mobile communication system according to claim 9, wherein the channel matrix generating means further generates the channel matrix using the channel vectors at the multipath timings, the number of channel vectors in the neighborhood of each of the multipath timings, and zero.

12. A mobile communication system according to claim 9, further comprising:
channel state estimating means for estimating a channel state according to the received signals, judging means for judging, according to the channel state estimated by the channel state estimating means, whether equalization by each equalizer is required for a channel condition; and selecting means for operating each equalizer to equalize the received signals if the judging means determines that the equalization by each equalizer is required for the propagation channel path, and making the received signals pass finger rake means to thereby suppress the equalization by each equalizer.

13. A mobile communication system according to claim 12, wherein:
the channel state estimating means estimates at least one of a signal to interference power ratio, a signal to noise power ratio, a signal to noise interference power ratio, and noise; and
the judging means determines that the equalization by each equalizer is required for the channel condition if the estimated value from the channel state estimating means is more than a predetermined value, and determines that the equalization by each equalizer is not required for the channel condition if the estimated value from the channel state estimating means is less than the predetermined value.

14. A mobile communication system according to claim 12, wherein:
the channel state estimating means estimates at least one of a multipath number, a multipath interval, and a delay deviation; and
the judging means determines, according to the estimated value from the channel state estimating means, whether the equalization by each equalizer is required for the channel condition.

15. A mobile communication system according to claim 9, further comprising:
transmission path judging means for judging, according to the multipath timings detected by the multipath timing detecting means, whether equalization by each equalizer is required for the channel condition; and selecting means for operating each equalizer to equalize the received signals if the judging means determines that the equalization by each equalizer is required for the channel condition, and making the received signals pass finger rake means to suppress the equalization by each equalizer.

16. A mobile communication system according to claim 9, further comprising:
channel judging means for judging, according to a criterion that at least the number of codes to be multiplexed is equal to or more than a fixed value, whether equalization by each equalizer is required for the channel condition; and selecting means for operating each equalizer to equalize the received signals if the judging means determines that the equalization by each equalizer is required for the channel condition, and making the received signals pass finger rake means to suppress the equalization by each equalizer.

17. A wireless apparatus including multipath timing detecting means for detecting a plurality of multipath timings in a received signal using a known signal, comprising:
channel vector estimating means for estimating channel vectors according to the multipath timings detected by the multipath timing detecting means; channel matrix generating means for arranging the channel vectors estimated by the channel vector estimating means, in a preset method according to the multipath timings, to thereby generate a channel matrix; weight calculating means for calculating a filter weight using the channel matrix generated by the channel matrix generating means, and one or more equalizers for equalizing received signals using the filter weight calculated by the weight calculating means, wherein:
the channel vector estimating means estimates the channel vectors at the multipath timings and a number of channel vectors in the neighborhood of each of the multipath timings; and
the channel matrix generating means generates the channel matrix using the channel vectors at each of the multipath timings and the number of channel vectors in the neighborhood of the multipath timings.

18. A mobile communication system according to claim 17, wherein the number of channel vectors in the neighborhood of the multipath timings is an integer equal to or more than one.

19. A mobile communication system according to claim 17, wherein the channel matrix generating means further generates a channel matrix using the channel vectors at the multipath timings, the number of channel vectors in the neighborhood of each of the multipath timings, and zero.

20. A wireless apparatus according to claim 17, further comprising:
channel state estimating means for estimating a channel state according to the received signals, judging means for judging, according to the channel state estimated by the channel state estimating means, whether equalization by each equalizer is required for a channel condition; and selecting means for operating each equalizer to equalize the received signals if the judging means determines that the equalization by each equalizer is required for the channel condition, and suppressing the equalization for the received signals if the judging means determines that the equalization by each equalizer is not required for the channel condition.

21. A wireless apparatus according to claim 20, wherein:
the channel state estimating means estimates at least one of a signal to interference power ratio, a signal to noise power ratio, a signal to noise interference power ratio, and noise; and
the judging means determines that the equalization by each equalizer is required for the channel condition if the estimated value from the channel state estimating means is more than a predetermined value, and determines that the equalization by each equalizer is not required for the channel condition if the estimated value from the channel state estimating means is less than the predetermined value.

22. A wireless apparatus according to claim 20, wherein:
the channel state estimating means estimates at least one of a multipath number, a multipath interval, and a delay deviation; and
the judging means determines, according to the estimated value from the channel state estimating means, whether the equalization by each equalizer is required for the channel condition.

23. A wireless apparatus according to claim 17, further comprising:
channel judging means for judging, according to the multipath timings detected by the multipath timing detecting means and based on a multipath state, whether equalization by each equalizer is required for a channel condition; and selecting means for operating each equalizer to equalize the received signals if the judging means determines that the equalization by each equalizer is required for the channel condition, and suppressing the equalization for the received signals if the judging means determines that the equalization by each equalizer is not required for the channel condition.

24. A wireless apparatus according to claim 23, wherein the channel judging means determines whether equalization by each equalizer is required for the channel condition, according to a criterion whether there exists a plurality of multipaths or whether an interval of the multipath is equal to or less than a fixed value.

25. A wireless apparatus comprising multipath timing detecting means for detecting multipath timings in a received signal using a known signal and conducting communication using a Code Division Multiple Access (CDMA), comprising:
channel vector estimating means for estimating a channel vector according to the multipath timings detected by the multipath timing detecting means; channel matrix generating means for arranging the channel vectors estimated by the channel vector estimating means, in a preset method according to the multipath timings, to thereby generate a channel matrix; weight calculating means for calculating a filter weight using the channel matrix generated by the channel matrix generating means, one or more equalizers for equalizing received signals using the filter weight calculated by the weight calculating means, and finger rake means for conducting reception according to the multipath timings detected by the multipath timing detecting means; wherein
the channel vector estimating means estimates the channel vectors of the multipath timings and the number of channel vectors in the neighborhood of each of the multipath timings; and
the channel matrix generating means generates the channel matrix using the channel vectors of the multipath timings and the number of channel vectors in the neighborhood of each of the multipath timings.

26. A wireless apparatus according to claim 25, wherein the number of channel vectors in the neighborhood of the multipath timings is an integer equal to or more than one.

27. A wireless apparatus according to claim 26, wherein the channel matrix generating means further generates a channel matrix using the channel vectors at the multipath timings, the number of channel vectors in the neighborhood of the multipath timings, and zero.

28. A wireless apparatus according to claim 25, further comprising:
channel state estimating means for estimating a channel state according to the received signals, judging means for judging, according to the channel state estimated by the channel state estimating means, whether equalization by each equalizer is required for a channel condition; and selecting means for operating each equalizer to equalize the received signals if the judging means determines that the equalization by each equalizer is required for the channel condition, and making the received signals pass finger rake means to thereby suppress the equalization by each equalizer.

29. A wireless apparatus according to claim 28, wherein:
the channel state estimating means estimates at least one of a signal to interference power ratio, a signal to noise power ratio, a signal to noise interference power ratio, and noise; and
the judging means determines that the equalization by each equalizer is required for a channel condition if the estimated value from the channel state estimating means is more than a predetermined value, and determines that the equalization by each equalizer is not required for the channel condition if the estimated value from the channel state estimating means is less than the predetermined value.

30. A wireless apparatus according to claim 25, wherein:
the channel state estimating means estimates at least one of a multipath number, a multipath interval, and a delay deviation; and
the judging means determines, according to the estimated value from the channel state estimating means, whether the equalization by each equalizer is required for the channel condition.

31. A wireless apparatus according to claim 25, further comprising:
channel judging means for judging, according to the multipath timings detected by the multipath timing detecting means, whether equalization by each equalizer is required for the channel condition; and selecting means for operating each equalizer to equalize the received signals if the judging means determines that the equalization by each equalizer is required for the channel condition, and making the received signals pass finger rake means to suppress the equalization by each equalizer.

32. A wireless apparatus according to claim 25, further comprising:
channel judging means for judging, according to a criterion that at least the number of codes to be multiplexed is equal to or more than a fixed value, whether equalization by each equalizer is required for the channel condition; and selecting means for operating each equalizer to equalize the received signals if the judging means determines that the equalization by each equalizer is required for the channel condition, and making the received signals pass finger rake means to suppress the equalization by each equalizer.

* * * * *